Dec. 7, 1965      V. L. FRIEDRICH      3,222,673
ELECTRONIC STRIP CAMERA USING DOPPLER SHIFT FOR DETERMINING
RELATIVE POSITION OF OBJECTS
Filed June 5, 1963
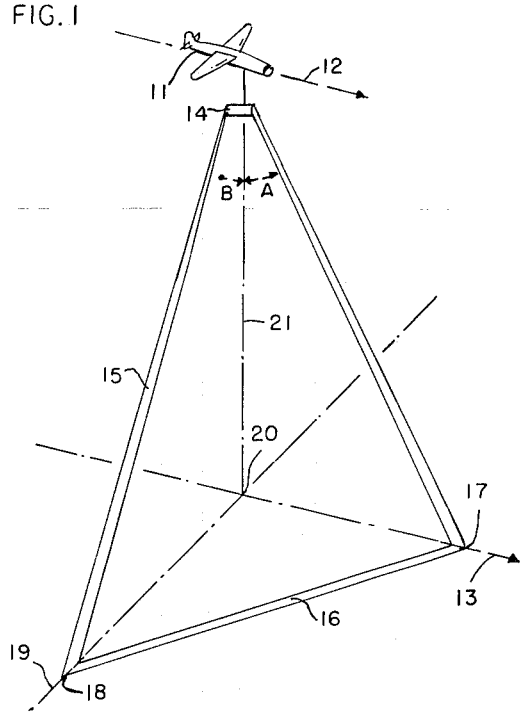
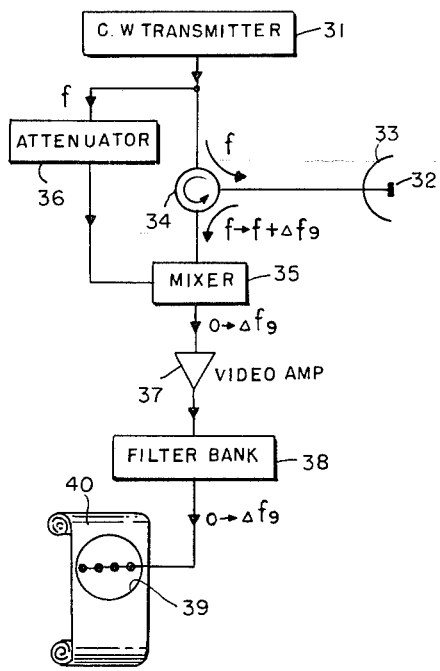
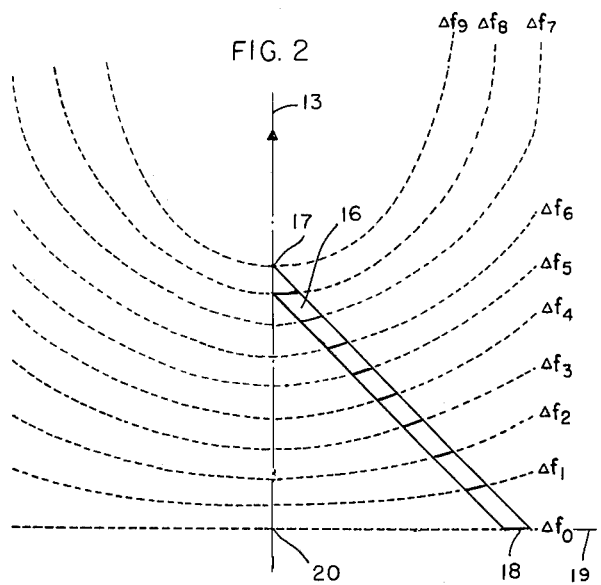
INVENTOR,
VICTOR L. FRIEDRICH
BY Harry M. Saragovitz,
Edward J. Kelly
Herbert Berl
Julian C. Keppler   ATTORNEYS.

United States Patent Office 3,222,673
Patented Dec. 7, 1965

3,222,673
ELECTRONIC STRIP CAMERA USING DOPPLER SHIFT FOR DETERMINING RELATIVE POSITION OF OBJECTS
Victor L. Friedrich, West Allenhurst, N.J., assignor to the United States of America as represented by the Secretary of the Army
Filed June 5, 1963, Ser. No. 286,148
2 Claims. (Cl. 343—8)
(Granted under Title 35, U.S. Code (1952), sec. 266)

The invention described herein may be manufactured and used by or for the Government for governmental purposes, without the payment of any royalty thereon.

The invention relates to an electronic strip camera and particularly to a method and apparatus for determining electronically the relative position of objects with respect to each other.

In the field of airborne, radar area surveillance and target location, the side-looking radar has found widespread use as an electronic strip camera. Present radars have the capability of seeing a long distance out from the side of the aircraft and can thus gather a large quantity of data over sizeable areas. Such data is derived with fair resolution; however, many small fixed targets of interest, near the path of flight, go unrecognized due primarily to a lack of range resolution. The present side-looking radars depend on a difference in time between received pulses to determine range location of targets. When looking almost straight down from the aircraft and off at only a relatively slight angle the distances from the antenna to the targets are relatively equal, thereby causing an almost undetectable difference in time between received pulses. Therefore, since the range resolution in and near the path of flight of the aircraft is extremely poor, present side-looking radars cannot be used successfully in this area.

The instant invention utilizes the phenomenon known as the Doppler effect for determining the location of targets in the vicinity of the aircraft's path of flight. A narrow strip of terrain extending from a point forward of the aircraft to a point off to the side of the aircraft is viewed by the radar beam. The point in front of the aircraft will be moving at a maximum relative velocity with respect to the aircraft along the direction of propagation of the radiated energy while the point to the side of the aircraft will have no relative velocity along the direction of propagation. Therefore, the received signals reflected from this narrow strip of terrain will have a band of Doppler shifts in frequency ranging from zero to some maximum value. Such a system, using a relatively low power continuous wave, can obtain a high resolution picture by the combination of a narrow radiated electromagnetic beam in one dimension and the Doppler frequency division in the other dimension.

It is therefore an object of this invention to provide a method and means for determining electronically the position of a plurality of objects with respect to each other by illuminating the objects with a thin strip of radiated electromagnetic energy; moving the thin strip of energy with respect to the objects such that the relative velocity of the energy with respect to each of the objects is different; and analyzing the difference in the frequency between the illuminating energy and the reflected energy to determine the location of the objects along said thin strip.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIGURE 1 represents an aircraft radiating energy while flying above the earth's surface;

FIGURE 2 is a geometrical representation of the Doppler frequency patterns formed on the earth's surface; and FIGURE 3 is a block diagram of the apparatus used to carry out the invention.

Referring now to the drawings there is shown in FIGURE 1 an aircraft 11 having a path of flight in the direction 12 which traversing a ground path 13. An antenna 14, mounted on aircraft 11, radiates a fan beam 15 such that a strip of terrain 16 is illuminated. The strip 16 may be made to extend from a point 17, which is on the ground path 13 and in front of the aircraft 11, to a point 18, which is off to the side of aircraft 11 and lies on a line 19. As shown in the figures, line 19 is normal to line 13 and intersects line 13 at a point 20 which is directly below the antenna 14. A line 21 is extended from the antenna 14 to point 20. The angles which the edges of the fan beam 15 make with the line 21 are designated A and B.

FIGURE 2 shows a family of hyperbolas which represent constant lines of Doppler frequency shift or isodops for an aircraft traveling in the direction of line 13 and with the transmitter located above point 20. All points along any one of the hyperbolas shown will have the same relative velocity with respect to the aircraft in the direction of propagation. Since, for any given frequency of radiation, the Doppler shift is a function of the relative velocity between the reflector and the radiator in the direction of propagation, energy reflected from all points along any one of the hyperbolas shown will have the same frequency shift. If the aircraft is traveling in the direction shown by the arrow on line 13, the further the hyperbola is displaced from line 19 the greater will be the frequency shift represented thereby.

As a result of this family of hyperbolas or isodops, and the band of frequency shifts $\Delta f_0 - \Delta f_9$ which the isodops represent, range resolution may be accurately determined in one dimension. Range resolution in the other dimension is fixed by the thickness of the narrow fan beam 15. This beam 15, illuminating the strip of terrain 16, cuts across each isodopic line once. Therefore, each shift in frequency may be associated with a specific point along the strip 16. The isodopic lines in FIGURE 2, which are illuminated by beam 15, are shown in solid lines while the dotted lines represent the portions not illuminated.

For example, assume an aircraft is flying over level terrain at an altitude $h$ and at a ground speed of $V_g$ with a radar emitting a pure unmodulated CW signal at a frequency of $f$. The point 17 will then have a relative velocity of $V_g \sin A$ with respect to antenna 14 in the direction of beam propagation. The shift in frequency due to the Doppler effect may be expressed by the formula $$\Delta f = \frac{2fV}{C}$$

where $f$ is the frequency of the transmitter wave, V is the relative velocity of the antenna with respect to the reflector in the direction of beam propagation, and C is the velocity of the waves transmitted in the media through which they are forced to travel. In the present example the frequency shift of waves reflected from point 17 will be $$\Delta f_9 = \frac{2fV_g \sin A}{C}$$

Reflections from point 18 will have a frequency shift equal to zero since there is no relative velocity between the antenna and point 18 in the direction of beam propagation. The remaining frequency shifts $\Delta f_1$ to $\Delta f_8$ will increase in value and will all lie between the range of frequencies from 0 to $\Delta f_9$.

A typical example would be an aircraft flying at an altitude of 1000 feet and at a ground speed of 350 feet per second with the radar emitting a CW signal at 70,000 mc. Angles A and B could be fixed at 45° which would make the distance between points 17 to 20 equal to 1000 feet and the distance between points 18 to 20 also equal to 1000 feet. The length of the strip 16 would be about 1400 feet. The shift in frequency caused by reflections from point 17 may be calculated from the above equation. $\Delta f_9$ will be equal to 35,000 c.p.s. Therefore, the band of frequency shifts due to the Doppler effect would range from 0 to 35,000 c.p.s.

The reflected energy which will contain a band of frequencies from $f$ to $f+\Delta f_9$ is then beat with energy at the transmitted frequency $f$ to obtain energy containing a band of frequencies from 0 to $\Delta f_9$. This band of frequencies may then be separated into a plurality of narrow bands having center frequencies of 0, $\Delta f_1$, $\Delta f_2$, $\Delta f_3$, $\Delta f_4$, $\Delta f_5$, $\Delta f_6$, $\Delta f_7$, $\Delta f_8$, and $\Delta f_9$. Of course, in practice many more narrow bands would be sampled for greater resolution and accuracy. The energy associated with each of the narrow bands is then analyzed to determine the characteristics of the target which produced the reflections. The thickness of the strip 16 and the value of the center frequency of the narrow bands will locate the various targets with respect to each other and with respect to the aircraft.

A system for carrying out this method is shown in FIGURE 3 which shows a continuous wave transmitter 31 feeding an antenna 32 having a reflector 33 of the parabolic cylinder type to produce the narrow fan beam 15. A circulator 34 is situated between the transmitter 31 and the antenna 32. A mixer 35 is also connected to the circulator 34. Circulator 34 provides a path for the transmitted signal to the antenna 32, and a path for the received signal from antenna 32 to the mixer 35. A small portion of the energy developed in transmitter 31 is sampled and fed to mixer 35 by attenuator 36 which will regulate the amount of energy sampled. The antenna 32 will receive reflected energy at the transmitted frequency plus all of the additional frequencies caused by the Doppler effect.

The transmitted frequency will be removed from the received signal in mixer 35. Therefore, the output of mixer 35 will be a signal which contains only the band of frequencies caused by the Doppler effect. This signal is then amplified in video amplifier 37 for subsequent use as a video signal in cathode ray tube 39. After being amplified the signal is applied to filter bank 38 where it is separated into a plurality of signals each having a narrow band of frequencies. Each narrow band will represent a specific range or position along the narrow strip 16 of the illuminated terrain. These signals having the narrow band of frequencies are then read out of the filter bank 38 in sequence to intensity modulate the cathode ray tube 39. A photographic film 40 is passed in front of the screen of the cathode ray tube 39 to photograph the display.

A strip map is built up on film 40 by moving the film and by reading the signal in unison with the aircraft. Each horizontal sweep across the tube 39 will be completed by the time it takes the aircraft to fly a distance equal to the thickness of the strip 16 in the direction of flight. The film 40 will be moved a distance equal to the thickness of the trace on the tube 39 for each horizontal sweep. In this way a complete map will be built up on the film 40. The picture obtained will appear similar to one taken by a wide angle lens since the portion of the picture immediately forward of the aircraft will be a frontal view whereas that from the side of the aircraft will be a side view.

Of course, the processing equipment, the cathode ray tube 39, the filter 38, etc., need not be located in the aircraft since the received signal could be recorded or stored for subsequent analysis or could be transmitted to some ground based station. The number of filters in the processor may be kept at a minimum, without sacrificing resolution, by processing the signal at a time rate less than the real time rate.

Various modifications are contemplated and may obviously be resorted to by those skilled in the art without departing from the spirit and scope of the invention, as hereinafter defined by the appended claims, as only a preferred embodiment thereof has been disclosed.

What is claimed is:

1. The method of determining the relative position of reflective objects substantially fixed in a planar pattern comprising; radiating from a point source a thin, substantially flat, diverging, fan-shaped beam of continuous wave electromagnetic energy of a single frequency at a predetermined angle to said pattern to illuminate a thin strip of said pattern; moving said point source substantially parallel to said pattern and in a predetermined direction not normal or parallel to the longitudinal axis of said strip such that a substantial number of said illuminated objects each have different radial velocities with respect to said point source to cause a broad band of Doppler frequency shifts in the reflected energy from said objects; receiving said reflected energy; separating said reflected energy into a plurality of narrow frequency bands; and displaying side by side the amount of energy in each said narrow band.

2. An electronic strip camera for recording the relative position of a substantially planar pattern of reflective objects with respect to each other comprising; means for transmitting a substantially flat, thin, fan-shaped beam of continuous wave electromagnetic energy of a single frequency; carrier means spaced from said planar pattern of objects for moving said transmitting means along a predetermined path spaced a fixed distance from said planar pattern and for directing said beam towards said objects and at a predetermined angle to said pattern to illuminate a thin strip of said objects; said path not being substantially parallel or perpendicular to the longitudinal axis of said strip; receiver means mounted in said carrier means for receiving energy reflected from said objects at said single frequency plus the broad band of Doppler frequency shifts; means for removing said single frequency from said received energy and for passing said energy containing only said broad band of Doppler shifts; filter means connected to said last-mentioned means for separating said energy into a group of narrow band channels; each said channel containing the energy associated with a different narrow band; and means for displaying side by side the energy contained in said channels.

References Cited by the Examiner

UNITED STATES PATENTS

| | | | |
|---|---|---|---|
| 2,847,666 | 8/1958 | Berger | 343—8 |
| 2,947,983 | 8/1960 | Whitfield | 343—8 |
| 3,072,901 | 1/1963 | Ruppersberg | 343—8 |
| 3,115,627 | 12/1963 | Pierce | 343—8 |
| 3,121,856 | 2/1964 | Finney | 343—9 |

CHESTER L. JUSTUS, *Primary Examiner.*